United States Patent
Delaney et al.

(10) Patent No.: US 11,200,241 B2
(45) Date of Patent: Dec. 14, 2021

(54) SEARCH QUERY ENHANCEMENT WITH CONTEXT ANALYSIS

(71) Applicant: International Business Machines Corporation, Armonk, NY (US)

(72) Inventors: Mark P. Delaney, Raleigh, NC (US); Robert H. Grant, Austin, TX (US); Charlotte Hutchinson, Surrey (GB)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 15/820,619

(22) Filed: Nov. 22, 2017

(65) Prior Publication Data

US 2019/0155934 A1    May 23, 2019

(51) Int. Cl.
| | | |
|---|---|---|
| *G06F 16/00* | (2019.01) | |
| *G06F 16/2457* | (2019.01) | |
| *G10L 15/18* | (2013.01) | |
| *G10L 15/22* | (2006.01) | |
| *G06F 16/9535* | (2019.01) | |
| *G06F 16/9537* | (2019.01) | |
| *G06F 16/2453* | (2019.01) | |
| *G06F 16/242* | (2019.01) | |

(52) U.S. Cl.
CPC ...... *G06F 16/24575* (2019.01); *G06F 16/243* (2019.01); *G06F 16/24539* (2019.01); *G06F 16/9535* (2019.01); *G06F 16/9537* (2019.01); *G10L 15/18* (2013.01); *G10L 15/22* (2013.01)

(58) Field of Classification Search
CPC .............. G06F 16/9535; G06F 16/635; G06F 16/90328; G06F 16/489; G06F 16/24575; G06F 16/9038; G06F 16/2477; G06F 16/248; G06F 16/90335; G06F 16/907; G10L 15/18

See application file for complete search history.

(56) References Cited

U.S. PATENT DOCUMENTS 7,827,170 B1 * 11/2010 Horling .................. G06F 16/93
707/722
8,452,855 B2   5/2013 Higgins et al.
(Continued)

FOREIGN PATENT DOCUMENTS

CN   1725822 A   1/2006
CN   102176206 A   9/2011
(Continued)

OTHER PUBLICATIONS

PCT/IB2018/058951 ISR with Written Search Report dated Apr. 5, 2019.
(Continued)

*Primary Examiner* — Augustine K. Obisesan
(74) *Attorney, Agent, or Firm* — Stephen R. Yoder (57) ABSTRACT

The context in which a user generates a search query is analyzed to generate an improved search query. Search query context may be determined with reference to a user profile or content collected from Internet of Things (IoT) or non-IoT devices located proximate the user. Content may be collected when the search query is generated or at a time before the search query is generated. Content collected for context analysis includes visual display content (screen capture), audio content, and data content.

19 Claims, 5 Drawing Sheets

(56) References Cited

U.S. PATENT DOCUMENTS

| | | | |
|---|---|---|---|
| 9,286,910 B1 | 3/2016 | Li et al. | |
| 9,348,920 B1* | 5/2016 | Kesin | G06F 16/31 |
| 10,579,635 B1* | 3/2020 | Mishne | G06F 16/3322 |
| 2008/0301117 A1* | 12/2008 | Zeng | G06F 16/951 |
| 2009/0112848 A1* | 4/2009 | Kunjithapatham | G06F 16/738 |
| 2009/0164929 A1* | 6/2009 | Chen | G06F 16/9535 715/769 |
| 2009/0228466 A1 | 9/2009 | Peters et al. | |
| 2009/0307205 A1* | 12/2009 | Churchill | G06F 16/9535 |
| 2010/0130125 A1* | 5/2010 | Nurmi | H04B 17/27 455/41.1 |
| 2011/0173217 A1* | 7/2011 | Kasperski | G06F 16/3322 707/767 |
| 2011/0289530 A1* | 11/2011 | Dureau | H04N 21/4826 725/38 |
| 2012/0030227 A1* | 2/2012 | Mital | G06F 17/27 707/767 |
| 2012/0054179 A1 | 3/2012 | Zhu et al. | |
| 2012/0117051 A1* | 5/2012 | Liu | G06F 16/90335 707/707 |
| 2014/0180672 A1 | 6/2014 | Mo et al. | |
| 2014/0373039 A1* | 12/2014 | Davis | H04N 21/4753 725/25 |
| 2015/0019714 A1 | 1/2015 | Shaashua et al. | |
| 2015/0052117 A1 | 2/2015 | Park | |
| 2015/0199431 A1 | 7/2015 | Brunet et al. | |
| 2015/0207701 A1* | 7/2015 | Faaborg | H04W 4/023 709/224 |
| 2015/0310105 A1* | 10/2015 | Brew | G06F 16/24575 707/706 |
| 2015/2886691 | 10/2015 | Marin | |
| 2016/0041991 A1* | 2/2016 | Sahuguet | G06F 16/3322 707/706 |
| 2016/0140223 A1* | 5/2016 | Ponting | G10L 15/063 707/749 |
| 2016/0162502 A1* | 6/2016 | Zhou | G06F 40/205 707/722 |
| 2016/0179962 A1* | 6/2016 | Patten | H04L 67/12 707/706 |
| 2016/0239571 A1* | 8/2016 | Rowe | H04N 21/2407 |
| 2017/0046124 A1* | 2/2017 | Nostrant | G10L 15/16 |
| 2017/0097932 A1* | 4/2017 | Bakshi | G06F 16/435 |
| 2017/0180497 A1* | 6/2017 | Comstock | H04L 67/42 |
| 2018/0101540 A1* | 4/2018 | Stoop | G06F 16/7867 |
| 2018/0150466 A1* | 5/2018 | Paquet | G06F 16/24578 |
| 2019/0080010 A1* | 3/2019 | Gupta | G06F 16/2453 |

FOREIGN PATENT DOCUMENTS

| | | | | |
|---|---|---|---|---|
| CN | 103020069 A | | 4/2013 | |
| CN | 104239465 A | | 12/2014 | |
| CN | 105975596 A | * | 9/2016 | |
| WO | WO-2018042179 A1 | * | 3/2018 | G06F 16/9535 |

OTHER PUBLICATIONS

"All of Facebook's Ad Targeting Options (in One Epic Infographic) | Wordstream" The WordStream Blog. Last updated on Sep. 6, 2017. <http://www.wordstream.com/blog/ws/2016/06/27/facebook-ad-targeting-options-infographic>.

Bouidghaghen, Ourdia, et al., "Context-Aware User's Interests for Personalizing Mobile Search," 2011 12th IEEE International Conference on Mobile Data Management, pp. 129-134.

Ceccaroni et al. "PaTac: Urban, ubiquitous, personalized services for citizens and tourists". 2009 Third International Conference on Digital Society. IEEE Computer Society. pp. 7-12.

Confalonieri, Roberto, et al., "Handling Uncertain User Preferences in a Context-Aware System,". Advances in Computational Intelligence, Part II: 14th International Conference on Information Processing and Management of Uncertainty in Knowledge-Based Systems, IPMU 2012, Catania, Italy, July 9-13.

Holtz et al. "I'm just on my phone and they're watching TV": Quantifying mobile device use while watching television. TVX '15, Jun. 3-5, 2015 Brussels Belgium.

* cited by examiner

SEARCH 1

| RANK | SEARCH RESULT | DEVICE CORRELATION FACTOR | USER PROFILE CORRELATION FACTOR | CUMULATIVE CORRELATION FACTOR |
|---|---|---|---|---|
| 1 | BCD – A VERB; ENCYCLOPEDIA WEBPAGE | 0.01 | 0 | 0.01 |
| 2 | BCD SMARTPHONE ACCESSORIES WEBPAGE | 0.01 | 0 | 0.01 |
| 3 | BCD CARS ENCYCLOPEDIA WEBPAGE | 0.70 | 0.70 | 1.40 |
| 4 | BCD CLOTHING LINE WEBPAGE | 0.01 | 0 | 0.01 |
| 5 | BCD FOOD COMPANY WEBPAGE | 0.01 | 0.2 | 0.21 |
| ... | | | | |
| 105 | BCD CARS COMMUNITY FORUM WEBPAGE | 0.50 | 0.60 | 1.10 |

SEARCH 2

400b

| RANK | SEARCH RESULT | DEVICE CORRELATION FACTOR | USER PROFILE CORRELATION FACTOR | CUMULATIVE CORRELATION FACTOR |
|---|---|---|---|---|
| 1 | BCD CARS ENCYCLOPEDIA WEBPAGE | 0.70 | 0.70 | 1.40 |
| 2 | BCD CAR ENTHUSIASTS SOCIAL MEDIA WEBPAGE | 0.60 | 0.70 | 1.30 |
| 3 | BCD CAR VIDEOS WEBPAGE | 0.60 | 0.60 | 1.20 |
| 4 | BCD CARS COMMUNITY FORUM WEBPAGE | 0.50 | 0.60 | 1.10 |
| 5 | BCD CAR ACCESSORIES WEBPAGE | 0.60 | 0.40 | 1.00 |

FIG. 4B

SEARCH QUERY ENHANCEMENT WITH CONTEXT ANALYSIS

BACKGROUND

The present invention relates generally to the field of data processing, and more particularly to information retrieval.

Internet of things (IoT) is the interconnection via the Internet of physical devices, vehicles, and other items embedded with electronics, software, sensors, actuators, and network connectivity which enable these objects to collect and exchange data. The IoT allows objects to be sensed or controlled remotely across existing network infrastructure, creating opportunities for more direct integration of the physical world into computer-based systems, and resulting in improved efficiency, accuracy, and economic benefit in addition to reduced human intervention. IoT has been applied to various industries including manufacturing, transportation, and agriculture. A growing portion of IoT devices are created for consumer use. Examples of consumer applications include connected car, entertainment, residences and smart homes, wearable technology, quantified self, connected health, and smart retail. Consumer IoT provides new opportunities for user experience and interfaces.

Search engines provide an interface to a group of items that enables users to specify criteria about an item of interest and have the engine find the matching items. The criteria are referred to as a search query. In the case of text search engines, the search query is typically expressed as a set of words that identify the desired concept that one or more documents contain. Some search engines enable users to specify entire documents, pictures, sounds, and various forms of natural language. Search engines apply improvements to search queries to increase the likelihood of providing a quality set of items.

SUMMARY

In one aspect of the present invention, a computer-implemented method, a computer program product, and a system includes: (i) receiving, on a first device, a set of search results from a search engine based on a first search query including a first set of search terms; (ii) collecting, from a second device located proximate the first device, a set of data; (iii) determining a first correlation parameter for each search result in the set of search results as a first degree of correlation to the set of data collected from the second device; (iv) receiving a user profile for a user, the user profile including a set of interests; (v) determining a second correlation parameter for each search result in the set of search results as a second degree of correlation to the set of interests; (vi) determining a second set of search terms from the search results based on the first degree of correlation indicated by the first correlation parameter and the second degree of correlation indicated by the second correlation parameter; and (vii) generating a second search query including the second set of search terms.

DETAILED DESCRIPTION

The context in which a user generates a search query is analyzed to generate an improved search query. Search query context may be determined with reference to a user profile or content collected from Internet of Things (IoT) or non-IoT devices located proximate the user. Content may be collected when the search query is generated or at a time before the search query is generated. Content collected for context analysis includes visual display content (screen capture), audio content, and data content. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
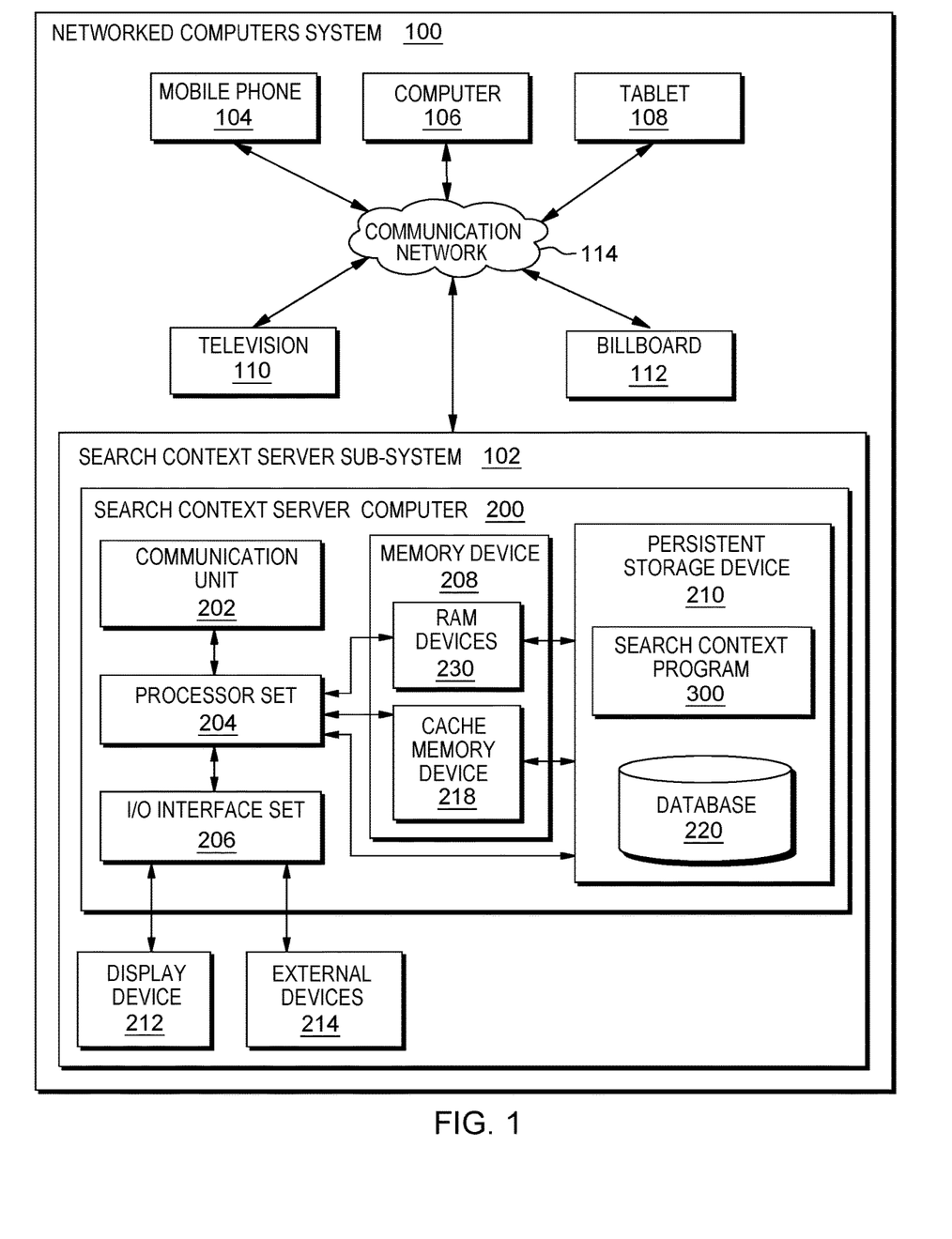
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: search context server sub-system 102; mobile phone 104, computer 106, tablet 108, television 110, billboard 112; and communication network 114. Search context server sub-system 102 contains: search context server computer 200; display device 212; and external devices 214. Search context server computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: search context program 300 and database 220.

Search context server sub-system 102 is, in many respects, representative of the various computer sub-systems in the present invention. Accordingly, several portions of search context server sub-system 102 will now be discussed in the following paragraphs.

Search context server sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Search context program 300 is a collection of machine readable instructions and/or data that is used to create, manage, and control certain software functions that will be discussed in detail, below, in the Example Embodiment sub-section of this Detailed Description section.

Search context server sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems. Communication network 114 can connect to a server hosting a search engine (not shown), such as the Google, Bing or Yahoo search engines. A server hosting a search engine returns search results based on search terms in a query via communication network 114.

Search context server sub-system 102 is shown as a block diagram with many double arrows. These double arrows (no separate reference numerals) represent a communications fabric, which provides communications between various components of search context server sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for search context server sub-system 102; and/or (ii) devices external to search context server sub-system 102 may be able to provide memory for search context server sub-system 102.

Search context program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Search context program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to search context server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with search context server computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., search context program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

In some embodiments, some or all of the components of search context server sub-system 102 may be included in mobile phone 104, computer 106, tablet 108. For example, search context program 300 and database 220 may be included mobile phone 104, computer 106, tablet 108.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
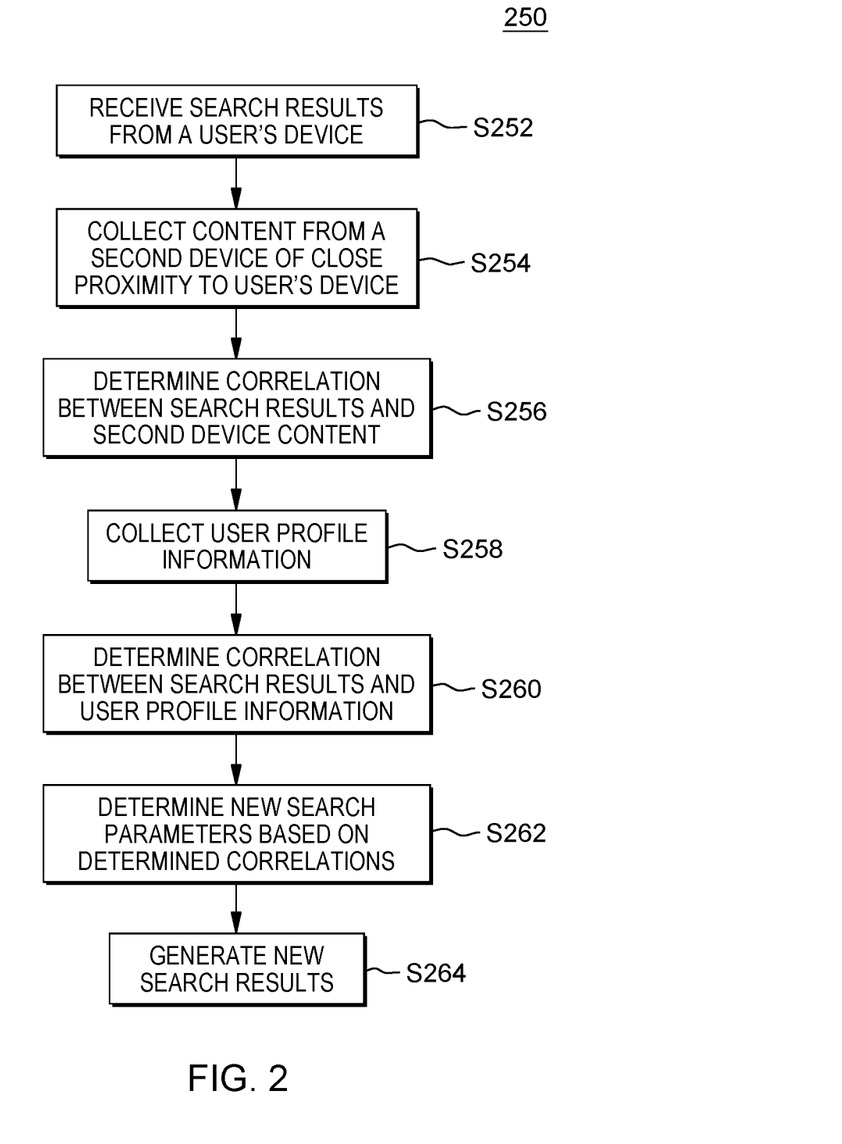
FIG. 2 is a flowchart showing a first embodiment method performed, at least in part, by the first embodiment system.
Figure 3:
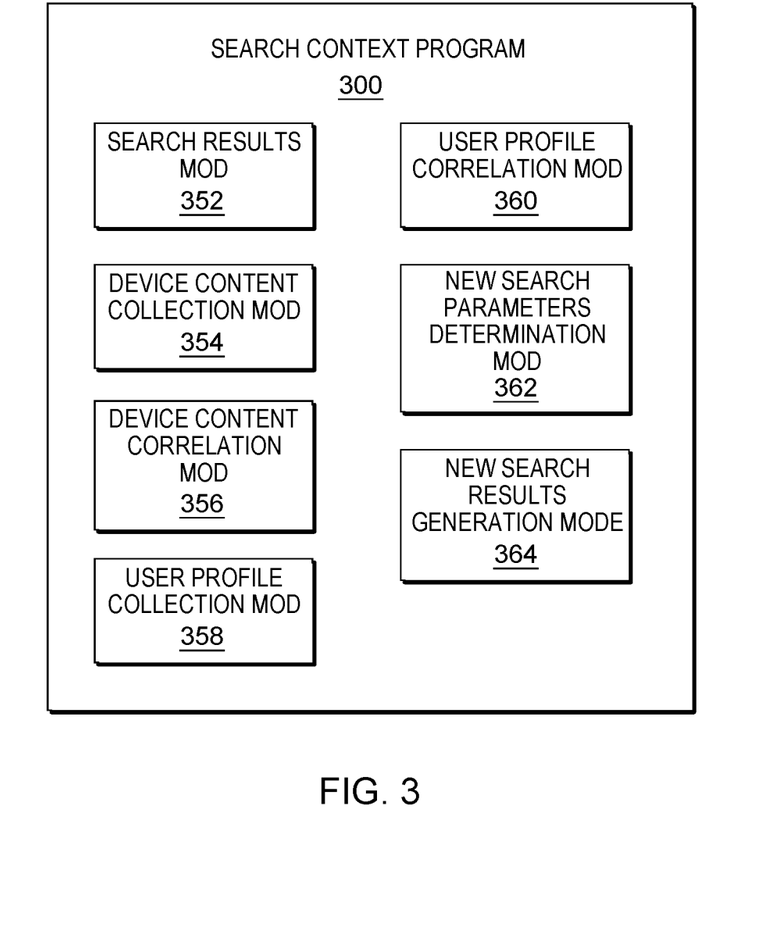
FIG. 3 is a block diagram view of a machine logic (e.g., software) portion of the first embodiment system.

FIG. 2 shows flowchart 250 depicting a method according to the present invention. FIG. 3 shows search context program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252, where search results module ("mod") 352 receives search results from a user's device. The search results are the product of an initial search query submitted on behalf of a user to an internet search engine. A device, as used herein, may be any computing device that can conduct an internet search, such as mobile phone 104, computer 106, or tablet 108 (see FIG. 1). The search results may be provided by a search engine that the computing device utilizes. The topic of the search may be anything of the user's interest or curiosity. Typically, the initial search query is generated by the user and is oftentimes prompted by one or more broadcasts from IoT devices or from something the user sees or hears in his or her local environment on a non-IoT device. However, the search may be conducted by user input or automated based on certain conditions or surrounding Internet of Things (IoT) devices. In this embodiment, user Abel searches for "BCD" on his mobile phone. BCD is a model of a car and Abel is watching a television show on cars. BCD is featured on the television show. The first search query for BCD results in a set of search results, the top five results being: an online encyclopedia article about BCD—a verb; BCD smartphone accessories; BCD cars encyclopedia; BCD clothing line; and BCD food company. The 105$^{th}$ search result is BCD cars community forum webpage. See FIG. 4A.

Processing proceeds to operation S254, where device content collection mod 354 collects a set of data, e.g., content, from a second device proximate to the user's device. In this example, the second device is an IoT device interconnected with the device used by the user. Alternatively, the second device produces audio proximate the user such that the audio stream is received by the device content collection mod. Alternatively, any device proximate the user that displays information may be collected by the device content collection mod. The second device may be any device that can display or output content, such as television 110 or billboard 112.

In various embodiments, a device, such as a TV, may be considered to be proximate a user device if it is located in the same room as the user device, for example, 2 feet away from the user device, or at a distance within 15 feet. A device may be also be considered to be proximate the user device if it can be seen by the user, who is in possession of the user device when the user is traveling on a street, for example, 15 feet away from the user, or at a distance within 50 or 100 feet from the user. In addition, a device may be also be considered to be proximate a user device if it is located within a wireless communication range, such as a WIFI range of 105 feet.

The set of data collected by device content collection module 354 may include content such as text, audio and even transformation of images to text by object recognition, expressed in a computer-readable format. Content that is an output from a device may be determined with techniques such as audio/video recognition, natural language processing, and meta-data analysis for tags existing on the content. Examples of content may include television and radio broadcasts, stock ticker listings, and digital billboard displays. The content from the device may be collected in a manner that can be analyzed and categorized based on methods such as natural language processing and meta-tag analysis. In various embodiments, a camera or microphone on the user's device is used capture static or video images, or audio content.

In this example, the set of data from the device is stored in database 220. Additionally, devices such as optimal head-mounted displays may be utilized to determine which device the user is looking at so that a particular device or devices are targeted for collection of output. In this embodiment, the television that Abel is watching the television show on is an IoT device. The audio and video from the television broadcast of the cars are collected by the device content collection mod. Natural language processing and audio/video recognition techniques used by the device content collection mod support categorization of the television broadcast as being related to BCD cars.

Processing proceeds to operation S256, where device content correlation mod 356 determines correlation between search results and second device content. A device correlation factor may be determined to quantify the correlation between each search result and the set of data, e.g., content collected from the second device. Historical data of the device output may be factored in to the device correlation factor. Time decay factors may be implemented to define how recent a user encountered the device. For example, if a user is in the vicinity of a digital billboard displaying an advertisement and three months later the user searches for the content of that advertisement, the correlation would likely be lower than if the user searches for the content of that advertisement five minutes after viewing the billboard.

In some embodiments of the present invention, a confidence value for the relevancy of a search result with respect to the recent output of a device is factored into the device correlation factor. Statistical methods that can emphasize variations and patterns such as principal component analysis (PCA) are implemented to relate the classification of device output to search results and establish a confidence value corresponding to a particular topic. Further, according to some embodiments of the present invention, statistical methods such as PCA are also used to determine the relevance of the device content output topic with respect to the search results. This relevancy determination is factored into the device correlation factor. In this example, the device correlation factor is calculated by multiplying the confidence value, the relevance value, and the time decay factor associated with the search results. The device correlation factor indicates the degree of correlation between each of the search results in the set of search results and the set of data collected from a particular IoT device or other proximate device broadcasting information collected by device content collection mod 354.

In this example, the device correlation factor is relatively high (0.70) for the search result of BCD cars encyclopedia. Similarly, the device correlation factor is relatively high (0.50) for the search result of BCD cars community forum. See FIG. 4A. There is minimal time decay factor as Abel is directly in front of the IoT television and searching for BCD cars while the BCD cars broadcast is playing. The confidence and relevance for the search results of BCD cars encyclopedia and cars community forum are high for the output from the IoT television. The device correlation factors for the search results online encyclopedia article about BCD—a verb, BCD smartphone accessories, BCD clothing line, and BCD food company are low because there are low confidence and relevance for the search result in comparison to the IoT output. If Abel had encountered a digital billboard advertising BCD clothing three weeks ago in the past, for example, the device correlation factor for BCD clothing may still be relatively low due to the time decay factor.

Processing proceeds to operation S258, where user profile collection mod 358 collects (or receives) user profile information. The user profile information includes a set of interests or components. It should be noted again that the steps in this example method may not be practiced in the precise order in which they are presented. Clearly, the user profile may be collected well before search results are received and may be a ready reference when device correlation is performed. Here, we present user profile collection after receipt of the original search results and after collecting nearby broadcast data from other devices. User profile information may include social media likes and comments, geolocation tags, online purchase habits, internet history, email messages, text messages, and/or calendar events. The user profile information may also include the user's location using global positioning systems. The foregoing information may be included in the user's set of interests. The user's location may be used to determine where the user is located and predict what kind of activities the user is involved with at a particular moment. User profile information may be determined with techniques such as audio/video recognition, natural language processing, and meta-data analysis for tags existing on the content. User profile information may be collected via user input or search context program 300 may automatically retrieve this information from user profile information sources. Users may link or unlink user profile information sources to the user profile. User profile information may be collected and stored in a database, such as database 220.

In this example, Abel's social media profiles, emails, text messages, online purchase habits, and internet history are all collected by the user profile collection mod. Some of Abel's user profile information includes historical data of videos viewed online about BCD cars, historical data of bids on online auction websites for BCD car parts, and previous posts on an online community forum about BCD cars. The user profile information regarding BCD cars were all collected from Abel within the last two months. The user profile collection mod utilizes audio/video recognition, natural language processing, and meta-data analysis to categorize the video viewing data, online auction purchases, and online community forum postings as related to BCD cars.

Processing proceeds to operation S260, where user profile correlation mod 360 determines correlation between for each search result in the set of search results and each interest item in the set of interests in the user profile information. The user profile correlation factor quantifies the correlation between each search result and interest items in the set of interests in the user profile information. Some embodiments of the present invention also factor in the timing of when user profile information was created as a time decay factor. Time decay factors such as this define how recent a user initiated or created a user profile information. For example, if a user likes and comments on a social media message about a certain product five minutes before receiving the search results, the correlation is higher than if the user had liked and commented on a social media message about a certain product 5 days ago. It should be noted that the correlation is relative to other actions. For example, if the posts dated 5 days prior to the search were the most recent posts and other posts were posted 1 month previous, the posts dated 5 days previous would be indicated a more likely contextually related to the current search result set than the posts 1 month previous.

In some embodiments of the present invention, a confidence value for the relevancy of a search result with respect to user profile information is factored into the user profile correlation factor. Statistical methods that emphasize variations and patterns, such as PCA, are implemented in some embodiments of the present invention to relate the classification of user profile information to search results and to establish confidence for a particular topic being contextually relevant. Statistical methods such as PCA are also useful in determining the relevance of the user profile information with respect to the search results. Some embodiments of the present invention determine relevancy to be factored into the user profile correlation factor. In this example, the user profile correlation factor is calculated by multiplying the confidence value, the relevance value, and the time decay factor. Regardless of how the user profile correlation factor is determined, with or without relevance and time decay factors, the resulting value is produced by user profile correlation mod 360 to determine the correlation between search results and the user profile information content.

In this example, the user profile correlation factor is relatively high (0.70) for the search result of BCD cars encyclopedia. Similarly, the user profile correlation factor is relatively high (0.60) for the search result of BCD cars community forum. See FIG. 4A. There is minimal time decay factor as Abel had viewed videos online about BCD cars, made bids on online auction websites for BCD car parts, and posted on an online community forum about BCD cars with the last two months. The confidence and relevance for the search results of BCD cars encyclopedia and BCD cars community forum are high for Abel's user profile information. In this example, other user profile information with relevance to other search results are minimal and from years ago. The device correlation factors for the search results online encyclopedia article about BCD—a verb, BCD smartphone accessories, BCD clothing line, and BCD food company are low because there would be low confidence and relevance for the search result in comparison to the user profile information. If Abel had previously visited the website of BCD food company 5 years ago, for example, the user profile correlation factor may still be relatively low due to the time decay factor.

Figure 4A:
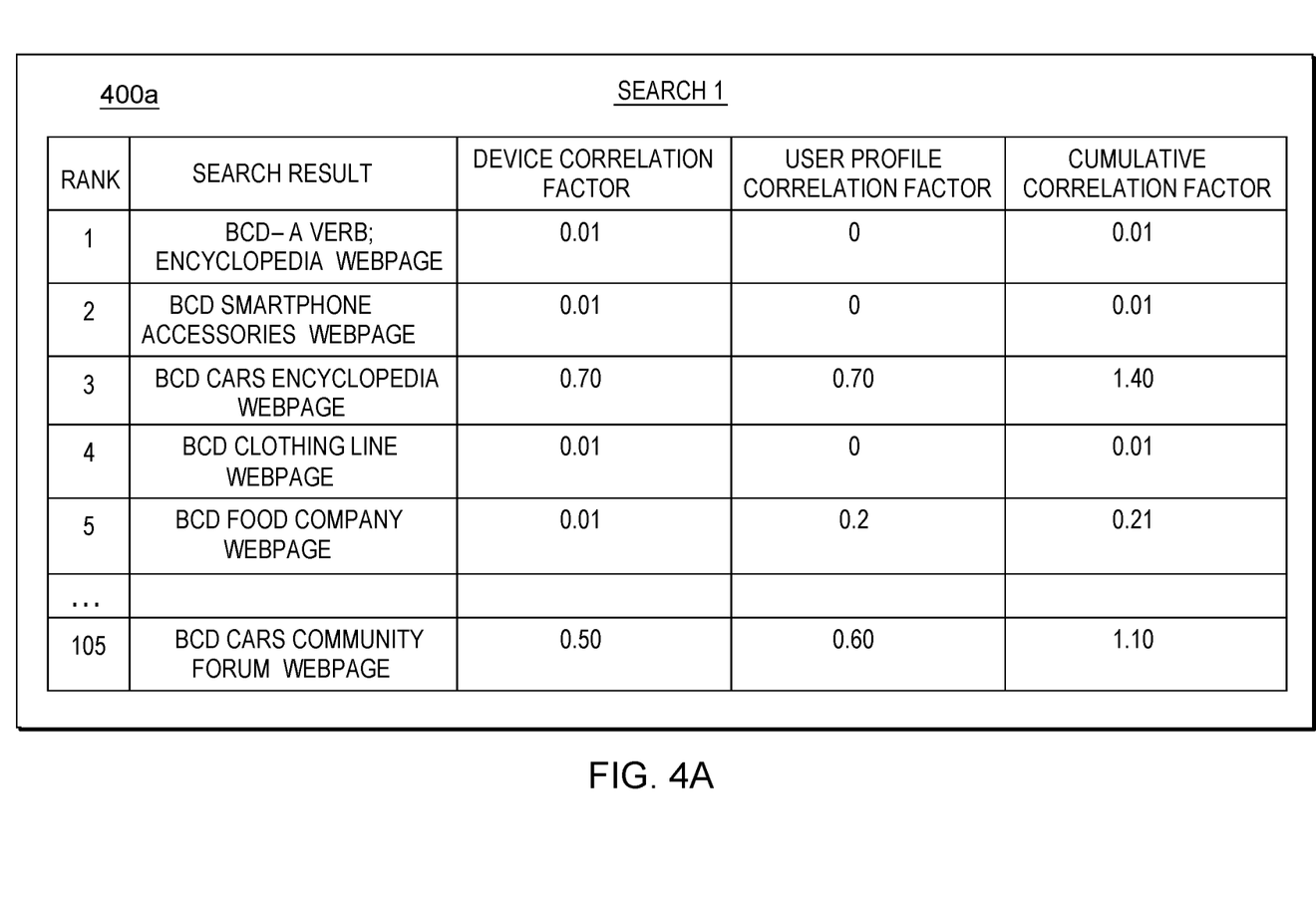
FIG. 4A is a first screenshot generated by the first embodiment computers system.

Processing proceeds to operation S262, where new search parameters determination mod 362 determines or generates new search parameters or terms for use in a second search query based on determined correlations. The device correlation factor determined in operation S256 and the user profile correlation factor determined in operation S260 are used as input to determine a cumulative correlation factor. Example cumulative correlation factor are shown in FIG. 4A. In this example, the cumulative correlation factor is determined by adding the device correlation factor to the user profile correlation factor. Alternatively, one factor is weighted in favor of another factor according to user preference and/or governing policy. If multiple devices are in range and produce similar device correlation factor values, the user profile correlation factor may have greater influence on the cumulative correlation factor. In an embodiment, user profile information may be used to select the content from a particular device when two devices are at about the same distance from a user's device. For example, a first billboard sign displays the stock price for LUV and a second billboard displays a cosmetic called LUV. The first and second signs are at about the same distance from a user's device. A user profile including interests in investments and the stock market, but not cosmetics, would cause content of the first billboard sign to be collected or received. Some embodiments of the present invention apply a correlation threshold for the cumulative correlation factor so that only highly correlated devices influence the new search query.

If the cumulative correlation factor is greater than the correlation threshold, statistical methods, such as PCA, are available to produce only the search query corresponding to high cumulative correlation factors. One example statistical method uses an orthogonal transformation to convert the search results into a set of values of linearly uncorrelated variables. The number of variables may be less than or equal to the smaller of the number of original variables. This transformation is defined in such a way that the first variable has the largest possible variance, and each succeeding variable in turn has the highest variance possible under the constraint that it is orthogonal to the preceding variables. Accordingly, the vectors and quadrants from the PCA eigenvalue analysis are dictated by component analysis and normalized linear combination terms from the device from which the set of content data is collected, the user profile information, and the search results. Search query terms determined by statistical methods, such as PCA, are added by the new search parameters determination mod 362 as new or second set of search parameters or terms.

In this example, the device correlation factor and the user profile correlation factor for BCD search results are combined without weighting to determine a cumulative correlation factor. The cumulative correlation factors for BCD cars encyclopedia and BCD cars community forum are relatively high due to the high device correlation and user profile correlation factors. The cumulative correlation factors for the other search results are relatively low due to the low device correlation and user profile correlation factors for those search results. In this example, as shown in FIG. 4A, the cumulative correlation factors for BCD cars encyclopedia and BCD cars community forum are 1.4 and 1.1 respectively, while the cumulative correlation factors for the other search results are below 1. Now, in this example, new search parameters determination mod 362 requires a correlation threshold of 1. Because the cumulative correlation factors of BCD cars encyclopedia and BCD cars community forum are greater than the correlation threshold, new search parameters are established that favor search results regarding BCD cars. In some embodiments, the term "BCD cars" is added to new search parameters for the new search query to produce a more relevant set of search results. In some embodiments, terms appearing with the "BCD cars" search results, such terms appearing in an excerpt from the webpage for the "BCD cars" shown with the link to the webpage in the first set of search results, may be included in the second set of search terms for the second search query.

Figure 4B:
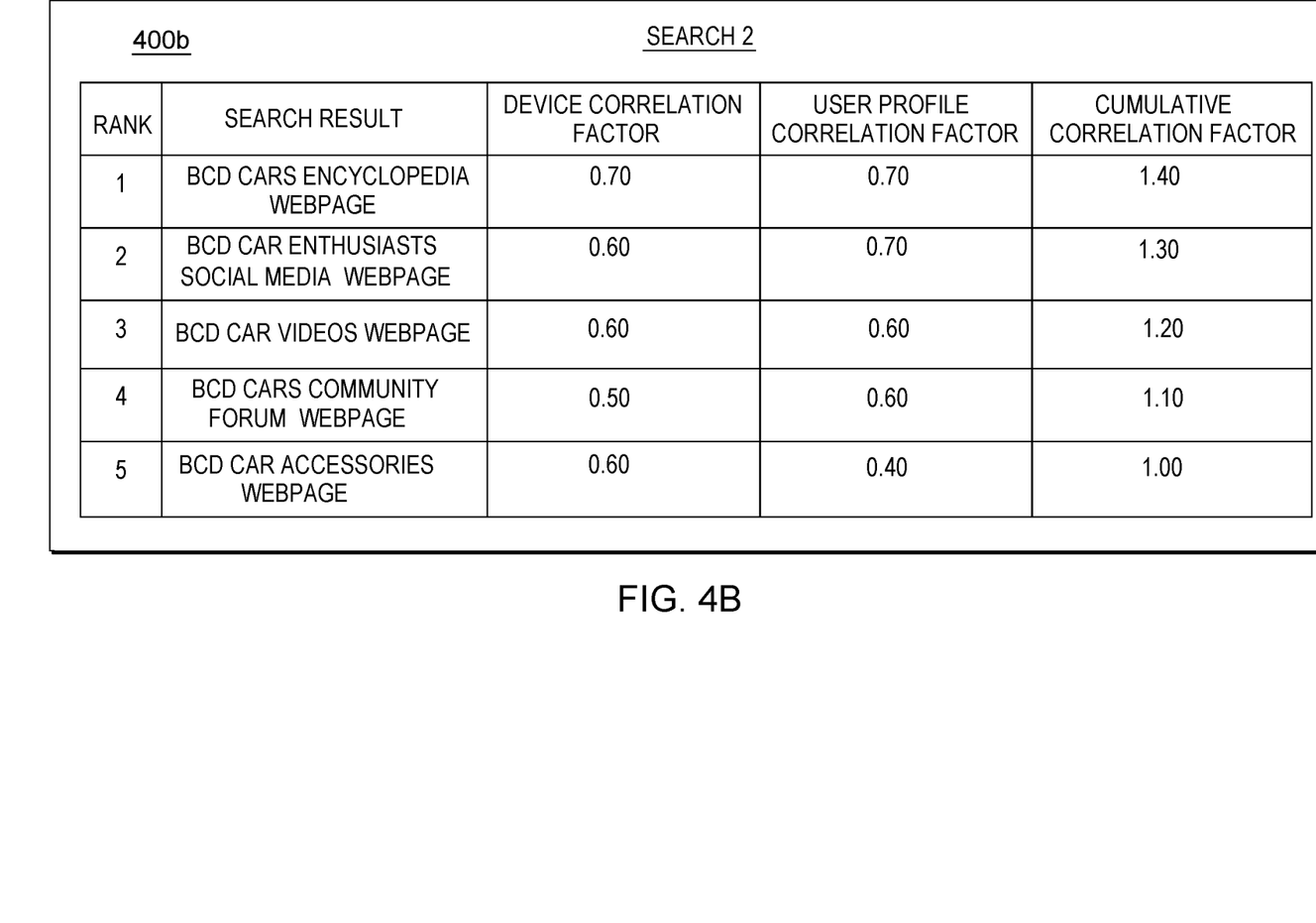
FIG. 4B is a second screenshot generated by the first embodiment computers system.

Processing proceeds to operation S264, where new search results generation mod 364 generates new search results. Based on the new search parameters determined in operation S262, the new search results generation mod conducts a new search by submitting a second search query including the second set of search term to a search engine. The new set of search terms emphasizes content found in an IoT device or other devices from which data was collected and the user profile information. In this example, new search results are generated for Abel. The top new search results are relevant to BCD cars. In this example, as shown in FIG. 4B, the top search results for Abel for "BCD" are an online encyclopedia webpage about BCD cars, a social media page for BCD car enthusiasts, BCD car videos, an online community forum regarding BCD, and a BCD car accessories webpage.

In the above example, the device correlation factor and the user profile correlation factor are combined to determine a cumulative correlation factor. It should be appreciated that use of the user profile correlation factor to determine a cumulative correlation factor is optional and not required. In some embodiments, the cumulative correlation factor may be based solely on the device correlation factor. These alternative embodiments may be advantageous where the set of interests of the user profile is unavailable or does not include a user interest or user profile component that is related to the set of data collected from the device in a statistically significant way.

Some embodiments of the present invention intercept the original search results, process the search results as described above and produce for the user a set of revised search results without the user ever seeing the original search results. As will be appreciated by those of ordinary skill in the art, the disclosed invention may operate completely without input from the user between sending the original search query and receiving the search results.

III. Further Comments and/or Embodiments

Some embodiments of the present invention recognize the following facts, potential problems, and/or potential areas for improvement with respect to the current state of the art. Devices are regularly displaying and outputting information for consumption by a user. When a user searches for information on a personal device, such as a mobile phone, search results may have an entirely different context or relevancy than what prompted the user to enter the search query. Oftentimes, a search query create by a user is related closely with what the user recently viewed, heard, or read from outputting devices. Search results are sometimes not contextual to what a user is experiencing or thinking about.

Some embodiments of the present invention generate a context-aware search query by performing the following process: receiving a set of search results on a first device, the search results generated from a first search based on a first set of search terms; receiving the output of a second device and determining a content of the output of the second device, wherein the second device is at a location proximate to the first device; determining a first correlation parameter for each search result in the set of search results, each first correlation parameter indicating a degree of correlation between the content output by the second device and the respective search result; receiving a user profile for a user, the user profile including one or more interests of the user; determining a second correlation parameter for each search result in the set of search results, each second correlation parameter indicating a degree of correlation between an interest in the user profile and the respective search result; ranking the search results based on the first and second correlation parameters; and generating a second set of search terms for use in a second search, wherein in the second set of search terms includes one or more terms included in a search result having highest rank.

Some embodiments of the present invention receive input from the second device by capturing an image of visual output (screen capture) from the second device with a camera. Alternatively, some embodiments of the present invention receive input from the second device by capturing audio output from the second device with a microphone. Alternatively, some embodiments of the present invention receive input from the second device by capturing a data stream being input to the second device that is used to generate the output of the second device.

Some embodiments of the present invention determine the content of the output of a device by using image and audio processing techniques. Alternatively, some embodiments of the present invention determine the content of the output of a device by using metadata embedded in the data stream. An audio processing technique employed by some embodiments of the present invention is natural language processing.

Some embodiments of the present invention determine a profile of a user from a history of content viewed by the user. Alternatively, some embodiments of the present invention determine a profile of a user from likes and/or comments of the user on a social media application. Alternatively, some embodiments of the present invention determine a profile of a user from a calendar entry on the user's calendar at a time the output of the second device is received. Alternatively, some embodiments of the present invention determine a profile of a user from a location history for the user. Alternatively, some embodiments of the present invention determine a profile of a user from an analysis of speech of the user.

FIG. 4A is screenshot 400a showing an initial search conducted by the user in the exemplary embodiment. In this example, user Abel conducts a search of BCD cars. The search for BCD results in hundreds of search results. The top five search results, as well as search result 105, are shown in screenshot 400a. As seen in screenshot 400a: (i) BCD—a verb encyclopedia webpage is ranked as the first result, with a device correlation factor of 0.01, user profile correlation factor of 0, and a cumulative correlation factor of 0.01; (ii) BCD smartphone accessories webpage is ranked as the second result, with a device correlation factor of 0.01, user profile correlation factor of 0, and a cumulative correlation factor of 0.01; (iii) BCD cars encyclopedia webpage is ranked as the third result, with a device correlation factor of 0.70, user profile correlation factor of 0.70, and a cumulative correlation factor of 1.40; (iv) BCD clothing line webpage is ranked as the fourth result, with a device correlation factor of 0.01, user profile correlation factor of 0, and a cumulative correlation factor of 0.01; (v) BCD food company webpage is ranked as the fifth result, with a device correlation factor of 0.01, user profile correlation factor of 0.20, and a cumulative correlation factor of 0.21; and (vi) BCD cars community forum webpage is ranked as the 105th result, with a device correlation factor of 0.50, user profile correlation factor of 0.60, and a cumulative correlation factor of 1.20.

FIG. 4B is screenshot 400b showing a second search conducted by the user with search context program 300 in the exemplary embodiment. In this example, user Abel conducts a search of BCD cars and search context program 300 generates new results. Search context program 300 generates hundreds of search results. The top five search results are shown in screenshot 400b. As seen in screenshot 400b: (i) BCD cars encyclopedia webpage is ranked as the first result, with a device correlation factor of 0.70, user profile correlation factor of 0.70, and a cumulative correlation factor of 1.40; (ii) BCD car enthusiasts social media webpage is ranked as the second result, with a device correlation factor of 0.60, user profile correlation factor of 0.70, and a cumulative correlation factor of 1.30; (iii) BCD car videos webpage is ranked as the third result, with a device correlation factor of 0.60, user profile correlation factor of 0.60, and a cumulative correlation factor of 1.20; (iv) BCD cars community forum webpage is ranked as the fourth result, with a device correlation factor of 0.50, user profile correlation factor of 0.60, and a cumulative correlation factor of 1.10; and (v) BCD car accessories webpage is ranked as the fifth result, with a device correlation factor of 0.60, user profile correlation factor of 0.40, and a cumulative correlation factor of 1.00. BCD cars encyclopedia webpage was previously ranked third in the initial search, as seen in FIG. 4A, is now ranked first by search context program 300, as seen in FIG. 4B. BCD cars community forum webpage was previously ranked 105th in the initial search, as seen in FIG. 4A, is now ranked fourth by search context program 300.

Some embodiments of the present invention may include one, or more, of the following features, characteristics, and/or advantages: (i) an input from the physical world around the user is used for understanding the search context; (ii) an input from the user's background and profile inform the context of a user's search query; (iii) more specific and contextual search results are obtained by analyzing the context in which a user generates a search query; (iv) interacts with a number of devices in a user's proximity to understand the context in which a search query was generated; (v) consideration of device context at a point in time and place allows for customized context-based search results to be generated; and/or (vi) use of user profile information to create a cognitive profile for the user supports context-based modification of a search query.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:
1. A computer-implemented method comprising:
   collecting profile information including a set of interests based on social media likes and comments and internet history;
   recording audio transmitted at a first time by a broadcasting device, the transmitted audio being captured by a microphone and stored for analysis;

receiving, on a first device at a second time, a set of search results from a search engine based on a first search query including a first set of search terms;

determining a first time-decay parameter for the set of search results as a first degree of correlation to the first time when the recorded audio was transmitted by the broadcasting device, the first time-decay parameter indicating recency of transmitting the recorded audio with respect to a current time, and the first degree of correlation comparing the recency of transmitting the recorded audio with respect to the recency of receiving the set of search results with respect to the current time;

responsive to the first degree of correlation exceeding a first threshold degree of correlation, determining a set of new terms used in the recorded audio transmitted by the broadcasting device by using an audio processing technique on the recorded audio, the set of new terms not included in the first set of search terms;

identifying a set of relevant terms within the set of new terms by correlating the set of interests to the new terms; and submitting a second search query to the search engine, the second search query including the set of relevant terms and original terms in the first set of search terms.

2. The method of claim 1, further comprising:
collecting a set of data including the audio and an image of visual output from the broadcasting device, wherein collecting the image includes capturing the image of visual output from the broadcasting device with a camera operated by the first device.

3. The method of claim 2, wherein the collecting a set of data includes capturing a data stream being input to the second device that is used to generate the image of visual output from the broadcasting device.

4. The method of claim 3, further comprising:
determining content of the image of visual output by using metadata embedded in the data stream.

5. The method of claim 1, wherein:
the audio processing technique includes natural language processing.

6. The method of claim 1, further comprising:
assigning a topic to portions of data in the recorded audio, the topic being contextually relevant to the search results;
wherein:
identifying the set of relevant terms is further based on correlating the topic to the new terms.

7. The method of claim 1, further comprising:
determining a user profile component from a history of content viewed by a user and a location history for the user according to a global positioning system.

8. The method of claim 1, wherein:
the second search query is determined in part according to a time decay factor accounting for when the audio is recorded and when the audio is listened to by a user.

9. A computer program product comprising a computer readable storage medium having stored thereon:
program instructions programmed to collect profile information including a set of interests based on social media likes and comments and internet history;
program instructions programmed to record audio transmitted at a first time by a broadcasting device, the transmitted audio being captured by a microphone and stored for analysis;
program instructions programmed to receive, on a first device at a second time, a set of search results from a search engine based on a first search query including a first set of search terms;
program instructions programmed to determine a first time-decay parameter for the set of search results as a first degree of correlation to the first time when the recorded audio was transmitted by the broadcasting device, the first time-decay parameter indicating recency of transmitting the recorded audio with respect to a current time, and the first degree of correlation comparing the recency of transmitting the recorded audio with respect to the recency of receiving the set of search results with respect to the current time;
program instructions programmed to, responsive to the first degree of correlation exceeding a threshold degree of correlation, determine new terms used in the recorded audio transmitted by the broadcasting device by using an audio processing technique on the recorded audio, the new terms not included in the first set of search terms;
program instructions programmed to identify a set of relevant terms within the set of new terms by correlating the set of interests to the new terms; and
program instructions programmed to submit a second search query to the search engine, the second search query including the set of relevant terms and original terms in the first set of search terms.

10. The computer program product of claim 9, further comprising:
program instructions programmed to collect a set of data including the audio and an image of visual output from the broadcasting device, wherein collecting the image includes capturing the image of visual output from the second device with a camera operated by the first device.

11. The computer program product of claim 10, wherein:
collecting the set of data includes capturing a data stream being input to the broadcasting device and used to generate the image of visual output from the broadcasting device; and
further comprising:
program instructions programmed to determine content of the image of visual output by using metadata embedded in the data stream.

12. The computer program product of claim 9, wherein:
the audio processing technique includes natural language processing.

13. The computer program product of claim 9, further comprising:
program instructions programmed to assign a topic to portions of data in the recorded audio, the topic being contextually relevant to the search results;
wherein:
identifying the set of relevant terms is further based on correlating the topic to the new terms.

14. The computer program product of claim 9, further comprising:
program instructions programmed to determine a user profile component from a history of content viewed by a user and a location history for the user according to a global positioning system.

15. A computer system comprising:
a processor set; and
a computer readable storage medium;
wherein:
the processor set is structured, located, connected, and/or programmed to run program instruction stored on the computer readable storage medium; and
the program instructions include:
program instructions programmed to collect profile information including a set of interests based on social media likes and comments and internet history;
program instructions programmed to record audio transmitted at a first time by a broadcasting device, the transmitted audio being captured by a microphone and stored for analysis;

program instructions programmed to receive, on a first device at a second time, a set of search results from a search engine based on a first search query including a first set of search terms;

program instructions programmed to determine a first time-decay parameter for the set of search results as a first degree of correlation to the first time when the recorded audio was transmitted by the broadcasting device, the first time-decay parameter indicating recency of transmitting the recorded audio with respect to a current time, and the first degree of correlation comparing the recency of transmitting the recorded audio with respect to the recency of receiving the set of search results with respect to the current time;

program instructions programmed to, responsive to the first degree of correlation exceeding a threshold degree of correlation, determine new terms used in the recorded audio transmitted by the broadcasting device by using an audio processing technique on the recorded audio, the new terms not included in the first set of search terms;

program instructions programmed to identify a set of relevant terms within the set of new terms by correlating the set of interests to the new terms; and program instructions programmed to submit a second search query to the search engine, the second search query including the set of relevant terms and original terms in the first set of search terms.

16. The computer system of claim 15, further comprising:

program instructions programmed to collect a set of data including the audio and an image of visual output from the broadcasting device, wherein collecting the image includes capturing the image of visual output from the second device with a camera operated by the first device.

17. The computer system of claim 15, wherein:

the audio processing technique includes natural language processing.

18. The computer system of claim 15, further comprising:

program instructions programmed to assign a topic to portions of data in the recorded audio, the topic being contextually relevant to the search results;

wherein:

identifying the set of relevant terms is further based on correlating the topic to the new terms.

19. The computer system of claim 15, further comprising:

program instructions programmed to determine a user profile component from a history of content viewed by a user and a location history for the user according to a global positioning system.

* * * * *